United States Patent [19]
Kühnlein et al.

[11] 3,864,605
[45] Feb. 4, 1975

[54] OVERLOAD PROTECTION FOR MINIATURE D-C MOTORS

[75] Inventors: Hans Kühnlein, Nurnberg-Grossgrundlach; Helmut Rehahn, Nurnberg, both of Germany

[73] Assignee: Siemens Aktiengesellschaft, Munich, Germany

[22] Filed: Dec. 27, 1973

[21] Appl. No.: 428,689

[30] Foreign Application Priority Data
Dec. 29, 1972 Germany.......................... 2264134

[52] U.S. Cl. .............. 317/13 R, 317/13 B, 317/41, 318/221, 318/434
[51] Int. Cl. .......................................... H02h 7/08
[58] Field of Search .... 317/13 R, 13 A, 13 B, 13 C, 317/41; 318/221 R, 221 B, 221 C, 221 H, 229, 473, 430, 432, 434, 471, 138, 254; 310/DIG. 3; 323/68, 69

[56] References Cited
UNITED STATES PATENTS

| | | | |
|---|---|---|---|
| 3,303,402 | 2/1967 | Martin | 318/221 R |
| 3,562,587 | 2/1971 | Forst | 318/221 E |
| 3,593,081 | 7/1971 | Forst | 318/221 H |

*Primary Examiner*—J. D. Miller
*Assistant Examiner*—Patrick R. Salce
*Attorney, Agent, or Firm*—Kenyon & Kenyon Reilly Carr & Chapin

[57] ABSTRACT

An improved overload protection arrangement for use with minature commutatorless d-c motors in which a resistor having a positive temperature coefficient of resistivity is inserted in the lead common to all phase windings to thereby effectively limit the maximum current.

3 Claims, 2 Drawing Figures

OVERLOAD PROTECTION FOR MINIATURE D-C MOTORS

BACKGROUND OF THE INVENTION

This invention relates to miniature d-c motors in general, and more particularly to an improved overload protection arrangement for such motors which are provided with electronic commutation.

D-c motors are known in which an electronic commutation device controlled by the rotor is used and wherein a Y connected multi-phase winding is fed by semiconductors controlled thereby. In the application of these miniature d-c motors of this kind, an equipment such as magnetic tape recorders, record players and the like, the motor as well as the electronic circuitry controlling the motor can be overloaded if the rotor is stalled due to unskilled operation or another type of disturbance. One manner of avoiding damage due to overloads has been through the provision of ohmic resistors in the leads of the phase windings in order to limit the motor current. Such resistors, in order to be effective, needed to be dssigned of a relatively large size. However, the introduction of such resistors results in a loss in efficiency if they are of sufficient size to effectively reduce the overload current. Although not of particular concern when such motors are fed from house current or the like, this becomes a series problem in battery operated equipment. Thus, to avoid undue battery drain, the only effective way of providing overload protection in such portable devices has been through the use of current regulators. This solution is out of question for mass-produced commercial articles because of its high cost. Thus, it can be seen that there is a need for an improved overload arrangement which provides adequate and safe protection without undue current drain.

SUMMARY OF THE INVENTION

The present invention provides overload protection for miniature d-c motors of the type described above in a simple and inexpensive manner. According to the present invention, a resistor having a positive temperature coefficient of resistivity, i.e., a negative temperature coefficient of electric conductivity is placed in the common lead of the phase windings of the motor. In the case of excessive loading of the motor the positive temperature coefficient resistor increases its resistance due to the increased current by several orders of magnitude and thereby limits the motor current to a harmless amount while still permitting the commutator to remain fully operative. In an additional embodiment of the invention, the positive temperature coefficient resistor is shunted by a conventional ohmic resistor so that the motor current and thus, the torque will not be allowed to decrease below a minimum fixed value, thereby permitting the motor to start-up immediately if the load causing the stalled condition is removed, even though with reduced torque. Once the current is switched off or substantially reduced, the positive temperature coefficient resistor cools down below its Curie temperature within a few seconds and the motor is then able to deliver its full torque immediately.

DETAILED DESCRIPTION OF THE PREFERRED EMBODIMENT

Figure 1:
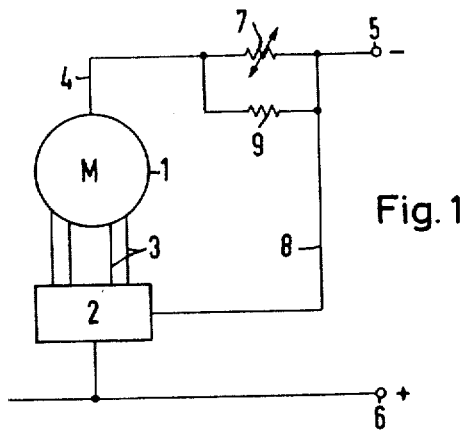
FIG. 1 is a circuit diagram of a first embodiment of the present invention.

FIG. 1 is a simplified diagram illustrating the present invention. A miniature d-c motor, which will include a permanent magnet rotor (not shown in detail on FIG. 1 for the sake of clarity), is fed by an electronic commutation device by four wires 3 which lead to the phase windings of the motor. In the illustrated embodiment, the motor has four phase windings which are Y connected with the neutral point being coupled through a line 4 to one terminal 5 of a d-c source. The commutation device comprises essentially at least four controlled semiconductors, for example, transistors, which are connected respectively in series with the phase windings of the motor 1 and to the other terminal 6 of the d-c source.

In accordance with the present invention, a resistor 7 having a positive temperature coefficient of resistivity, i.e., a negative temperature coefficient of electric conductivity, is placed in the lead 4 coupling the terminal 5 to the motor 1. As a result, if the motor is excessively overloaded, the resistance of the resistor 7 will increase to limit the current to a safe amount. During the limitation of motor current, the commutation device 2 will still be receiving the full voltage from the line 8 which is coupled to the terminal 5 and will remain fully operative. Since the resistance of the resistor 7 could increase to the point where insufficient current could be delivered to start up the motor once the disturbance causing the overload was removed, in the preferred embodiment, a resistor 9 is placed in parallel with resistor 7. This is a normal ohmic resistor and will ensure that the current does not drop below a level that will permit starting. During normal operation the effect of the resistor 9 on the motor efficiency is relatively small since under these conditions essentially all current will flow through the low-resistance resistor 7.

Figure 2:
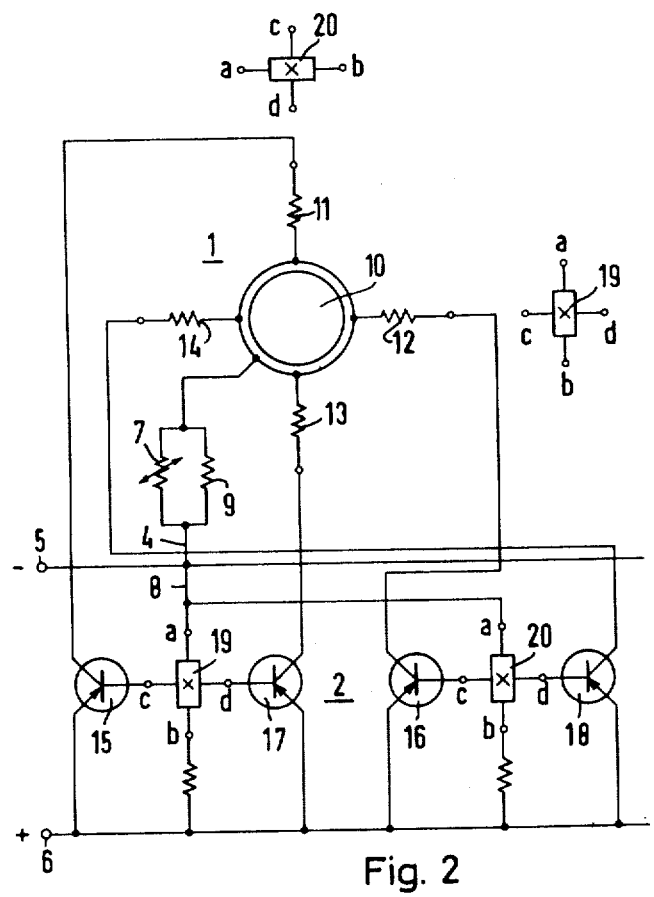
FIG. 2 is a similar circuit diagram illustrating a motor having Hall effect generator control.

An embodiment of the invention having a Hall effect electronic commutator control is illustrated by FIG. 2. Identical parts are given identical reference numerals. On FIG. 2, the permanent magnet rotor is designated 10 and the four phase windings designated 11, 12, 13 and 14 respectively. As shown, these are all tied together at a neutral point and connected to the terminal 5 with a line 4. As in the embodiment of FIG. 1, a positive temperature coefficient resistor 7 and a conventional ohmic resistor 9 in parallel are placed in series with the line 4. The other ends of each of the respective windings 11 through 14 are coupled to the positive terminal 6 through the emitter collector paths of respective transistors 15, 16, 17 and 18. These transistors are driven at their bases by Hall effect generators 19 and 20 which are shown twice in order to illustrate their positioning with respect to the motor 1. In each Hall effect generator, the control current terminals are designated $a$ and $b$ and the Hall voltage terminals as $c$ and $d$. Thus, as shown, the Hall voltage terminal $c$ of Hall effect generator 19 is coupled to the base of transistor 15 and the terminal $d$ to the base of transistor 17. Similarly, the Hall voltage terminal $c$ of Hall effect generator 20 is connected to the base of transistor 16 and the terminal $d$ to the base of transistor 18. The Hall effect generators by sensing the position of the rotor act to sequentially energize the phase windings in well known fashion. As clearly illustrated on FIG. 2, the Hall effect generators 19 and 20 are connected through line 8 directly to the full voltage so that they remain fully operative under all operating conditions.

In the illustrated embodiment, the power transistors 15 through 18 are driven directly by the Hall effect generators 19 and 20. In some cases, the power transistors will be driven not directly but through input transistors. In that case, the input transistors will also be connected with their emitter collector paths being provided with the full voltage in the same manner as the Hall effect generators 19 and 20.

Thus, an improved arrangement for providing overload protection for miniature d-c motors has been shown. Although specific embodiments have been illustrated and described, it will be obvious to those skilled in the art that various modifications may be made, without departing from the spirit of the invention which is intended to be limited solely by the appended claims.

What is claimed is:

1. In a d-c motor system including a d-c motor having a permanent magnet rotor and a Y connected multiphase stator winding and an electronic commutation device for driving the motor with the return from the motor being a line coupling the common terminal of Y connected stator winding and a voltage terminal, an improved overload protection circuit comprising a resistor having a positive temperature coefficient of resistivity placed in the common lead coupling the phase windings to the voltage terminal.

2. The system according to claim 1 and further in- including a conventional ohmic resistor in parallel with said resistor having a positive temperature coefficient of resistivity.

3. The system according to claim 2 wherein said electronic commutation device is a Hall effect device.

* * * * *